US008510458B2

(12) United States Patent
Nassor et al.

(10) Patent No.: US 8,510,458 B2
(45) Date of Patent: Aug. 13, 2013

(54) METHOD AND DEVICE FOR SHARING BANDWIDTH OF A COMMUNICATION NETWORK

(75) Inventors: Eric Nassor, Thorigne Fouillard (FR); Herve Le Floch, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 939 days.

(21) Appl. No.: 11/761,715

(22) Filed: Jun. 12, 2007

(65) Prior Publication Data

US 2007/0288651 A1 Dec. 13, 2007

(30) Foreign Application Priority Data

Jun. 13, 2006 (FR) ...................................... 06 52115

(51) Int. Cl.
*G06F 15/16* (2006.01)
*H04N 7/173* (2006.01)

(52) U.S. Cl.
USPC ............................... 709/231; 725/86; 725/95

(58) Field of Classification Search
USPC ....... 709/231; 725/86–87, 93, 95; 348/14.01
See application file for complete search history.

(56) References Cited

U.S. PATENT DOCUMENTS

| 5,768,535 | A | 6/1998 | Chaddha et al. ............... 395/200 |
| 7,228,502 | B2 | 6/2007 | Le Floch ........................ 715/723 |
| 7,433,327 | B2 * | 10/2008 | Harville et al. ................ 370/260 |
| 2001/0024233 | A1 | 9/2001 | Urisaka et al. ................. 348/213 |
| 2003/0076858 | A1 * | 4/2003 | Deshpande .................... 370/468 |
| 2003/0236904 | A1 * | 12/2003 | Walpole et al. ............... 709/231 |
| 2004/0179591 | A1 * | 9/2004 | Wenger et al. ........... 375/240.01 |
| 2005/0021726 | A1 * | 1/2005 | Denoual ........................ 709/223 |
| 2007/0024705 | A1 * | 2/2007 | Richter et al. ................. 348/142 |
| 2007/0200923 | A1 * | 8/2007 | Eleftheriadis et al. ...... 348/14.08 |
| 2007/0211799 | A1 * | 9/2007 | Henocq et al. ............ 375/240.16 |
| 2007/0263087 | A1 * | 11/2007 | Hong et al. .................. 348/14.13 |
| 2008/0068446 | A1 * | 3/2008 | Barkley et al. .............. 348/14.07 |
| 2008/0158339 | A1 * | 7/2008 | Civanlar et al. ............. 348/14.09 |
| 2009/0232200 | A1 * | 9/2009 | Henocq et al. ............ 375/240.01 |
| 2009/0296821 | A1 * | 12/2009 | Henocq et al. ............ 375/240.16 |

FOREIGN PATENT DOCUMENTS

| EP | 0 939 545 A2 | 9/1999 |
| WO | WO 2005/050992 A1 | 6/2005 |

OTHER PUBLICATIONS

ITU-T Tutorial, "Objective Perceptual Assessment of Video Quality", pp. 41-47.*
ITU-T Tutorial, "Objective Perceptual Assessment of Video Quality", pp. 41-47, published in 2004.*
Gilge, M. et al., "Motion Video Coding for Packet-Switching Networks—An Integrated Approach", Visual Communication and Image Processing 1991, Visual Communication, Nov. 11-13, 1991, vol. 1605, pp. 595-596.

(Continued)

*Primary Examiner* — Shirley Zhang
(74) *Attorney, Agent, or Firm* — Fitzpatrick, Cella, Harper & Scinto

(57) ABSTRACT

The method of sending at least one item of information relative to a multimedia data stream in a communication network is characterized in that it comprises the following steps carried out on a server device capable of sending the multimedia data stream over the network: obtaining at least one item of information relative to the data stream, said at least one item of information comprising an item of information on a visual quality of the multimedia data stream and an item of information on the bandwidth necessary for sending the stream with that visual quality, and sending said at least one obtained item of information over the communication network to a client device.

39 Claims, 9 Drawing Sheets

(56) References Cited

OTHER PUBLICATIONS

Muller, N., "Improving and Managing Multimedia Performance Over TCP/IP Nets", International Journal of Network Management, Wiley, GB, vol., 8, 1998, pp. 356-367.

Boudier, T., et al., "Vidos, a system for video editing and format conversion over the Internet", Computer Networks, Elsevier Science Publishers B.V., Amsterdam, NL, vol. 34, No. 6, Dec. 2000, pp. 931-944.

Nguyen, T., et al., "Multiple Sender Distributed Video Streaming", IEEE Transactions on Multimedia, vol. 6, No. 2, Apr. 2004, pp. 315-326.

\* cited by examiner

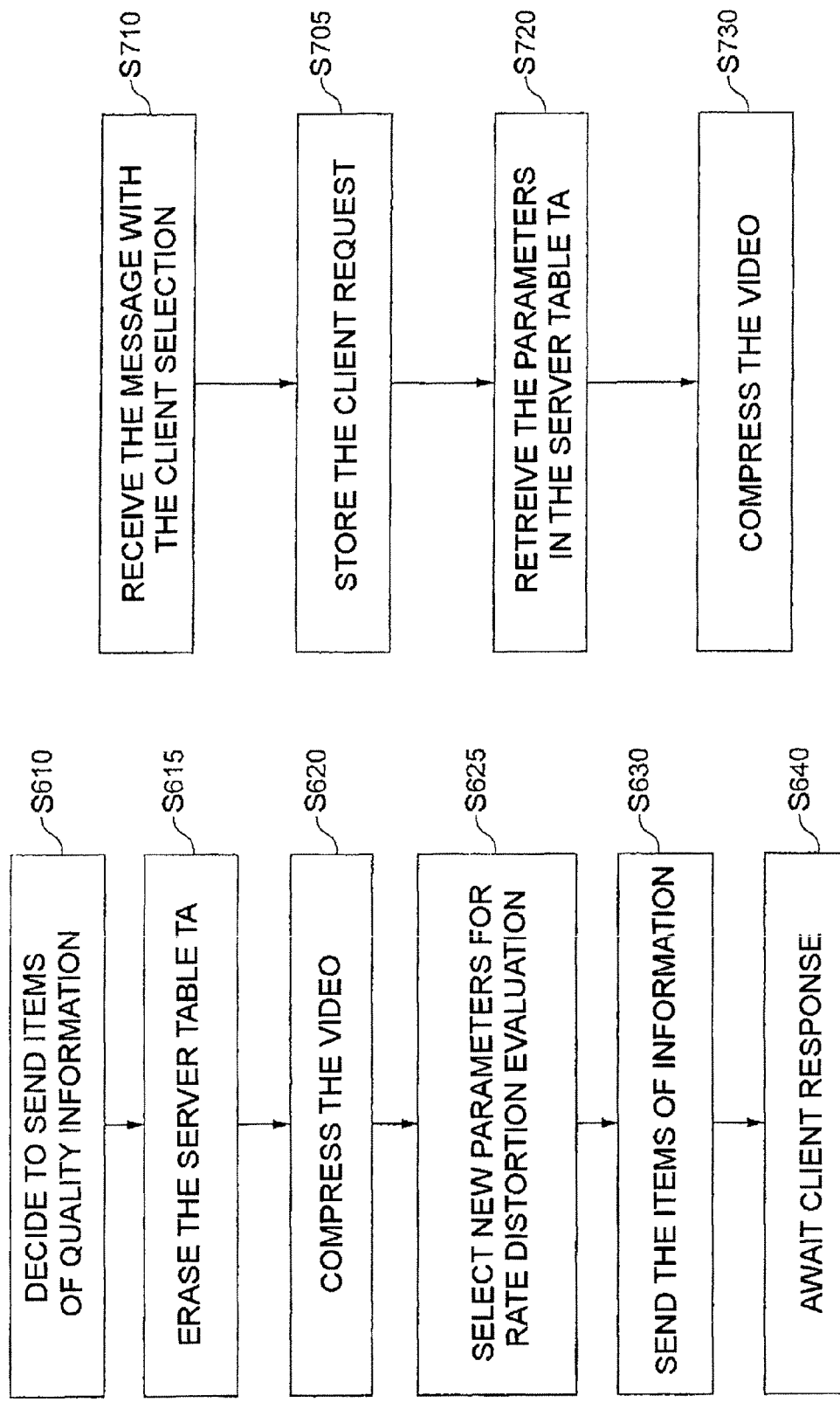

Fig. 7A

| Bandwidth | Visual quality | Quantization step size | Frequency | Resolution |
|---|---|---|---|---|
| B1 | Q1 | q1 | f1 | r1 |
| B2 | Q2 | q2 | f2 | r2 |

| Video | Use | Server proposals | Selection of q/b |
|---|---|---|---|
| A | Priority | Q1/B1<br>Q2/B2 | Q2/B2 |
| B | Normal | Q3/B3<br>Q4/B4<br>Q5/B5 | Q4/B4 |
| C | Normal | Q6/B6<br>Q7/B7 | Q7/B7 |

TB, idV, iv, po, ps

METHOD AND DEVICE FOR SHARING BANDWIDTH OF A COMMUNICATION NETWORK

The present invention relates to a method and device for sending at least one item of information relative to a multimedia data stream in a communication network and to a method and device for receiving information relative to multimedia data streams coming from at least two server devices of a communication network.

It has a general application in the processing of digital data streams and more particularly of digital video streams, compressed and transported from one or more sender devices, also termed server devices, to a receiver apparatus, also termed a client device, said server devices and client device being connected together via a communication network.

Increasing numbers of items of consumer equipment are now capable of sending elementary video streams, such as video cameras, stills cameras, video surveillance cameras, domestic video servers, TV receivers, computers, and telephones. Such elementary video streams that are intended to be sent may be stored and compressed in advance on the sender apparatus or on the contrary be captured, compressed and sent live to the receiver apparatus.

In practice the direct connection of all the sender apparatuses rapidly becomes impossible due to the limited number of sockets on the screen of the receiver apparatus. A domestic communication network is thus required to be used that is capable of bearing several elementary video streams simultaneously. In practice, the communication network may be open to the Internet to receive other video streams from server apparatuses connected to the Internet. It is also known that numerous apparatuses can now be connected to a digital network (for example of Ethernet type or a wireless network or directly to the Internet via a telephone network) on which there may be one or more receiver apparatuses. Generally, to have a rate compatible with that of the network the elementary video streams are compressed for example according to the MPEG 2 or MPEG 4 compression standards.

At the receiving end, the display apparatuses (screens) have also increased in size and in display quality (resolutions are now evolving towards high definition). For example, increasing numbers of display apparatuses display several images simultaneously in the form of a mosaic of images of the same size or of a set of images constituted by a main image of a video stream and images of reduced size of other elementary video streams. Increasing numbers of receiver apparatuses are also connectable (directly or via an adaptor box) to a digital network to receive compressed digital video streams, decompress them and display them.

The major drawback of such communication networks (domestic or Internet) lies in the limitation of overall bandwidth, which may vary over time. Variations in the bandwidth may be due to problems of transmission quality. For example, in the case of a wireless domestic network, if the sender apparatus is moved or if objects move in the environment, interference may then occur. Electromagnetic disturbance may also be caused by other apparatuses (microwave ovens, telephones). Another cause for variation in the overall bandwidth may also be the use of the network by other applications for example Internet navigation or a video game.

If no preventive action is carried out, losses of data packets will occur during the video transmission, resulting in very considerable deterioration in the visual quality of the display: "frozen" images or image portions (no more movement), each error then propagating to the following images and being liable to lead to considerable deterioration.

To avoid such drawbacks, it is known to reduce the elementary bandwidth used by each video stream in order to be compatible with the overall bandwidth of the network. For example, such a reduction is made at the sender apparatus by compressing the video more strongly to reduce the rate. In practice, the compression consists of increasing the quantization step size, of reducing the frequency of the images, or of reducing the resolution of the images. Such a compression may however have a greater or lesser impact on the visual quality of the video displayed depending on the type of the video. For example, a video which shows a room with little movement (video surveillance camera) may be compressed strongly without too great a deterioration of the visual quality. By contrast, an action movie that is compressed too much risks having visual deterioration that is unacceptable for the user.

If several elementary video streams are simultaneously displayed on a display apparatus (for example in the form of a mosaic), differences in visual quality that are too great are unpleasant for the user. It would thus be worthwhile balancing the visual qualities between the different videos. Furthermore, if the attention of the spectator is given especially to one of the videos, it would be desirable for that one to have a better visual quality than the other videos.

The question thus arose of adapting the bandwidths of the elementary video streams according to the visual quality of the image viewed and/or according to the use made thereof.

A known solution for sharing the overall bandwidth between different video streams sent using the RTP protocol (*A Transport Protocol for Real-Time Applications*, RFC 1889) is to use an algorithm for calculating the bandwidth available for each stream, compatible with that used by TCP/IP. The TFRC algorithm (*TCP Friendly Rate Control*, RFC 3448) thus makes it possible to calculate an available bandwidth for an elementary video stream under the RTP protocol depending on the detected packet losses. The result makes it possible to fairly share the bandwidth between all the elementary streams: each elementary stream thus obtains on average an equal share. A video processing system (streaming) based on this algorithm thus reduces the bandwidth of each video to adapt it to the calculated bandwidth. All the videos thus have an identical rate on average. However, this results in deterioration in visual quality that is variable depending on the type of video. Furthermore, such a known solution has the drawback of not taking into account the use which is made of the video.

The document US 2005/20050021726 describes a system for video stream distribution, in which several client devices may connect to the same server device. The server device has a database of video streams that can be served. The video streams are compressed and analyzed in advance. The sharing of the overall bandwidth between the different client devices takes into account the visual quality of each video and the characteristics of the client devices. In practice, the visual quality of the video streams is adapted to the characteristics of the client device, by sharing the visual quality relatively uniformly between the client devices.

This known solution does not however make it possible to solve the problem of sharing the overall bandwidth when a client device is connected to several server devices. Furthermore, the system described in the patent US 2005/20050021726 does not make it possible to vary the visual quality of a video stream according to its use, but only according to the characteristics of the client device.

The paper "*Multiple sender distributed video streaming*" Nguyen, T.; Zakhor, A. Multimedia, IEEE Transactions on, Volume 6, Issue 2, Date: April 2004, Pages: 315-326, describes a system in which a client device connects to several server devices simultaneously to obtain a video stream. The client device decides on the sharing of the overall bandwidth between the different server devices using the characteristics of the network connections with the different server devices (the server devices which have a better bandwidth or fewer errors are given precedence). The client device chooses which data packets must be sent by each server device. In other words, the data packets are separated here from the correction packets to have a better chance of correcting the data if an error occurs in one of the connections.

Nevertheless, the solution described in this article does not make it possible to solve the problem relative to the sharing of the overall bandwidth of a communication network in which several elementary video streams are simultaneously received at a client device and in which the visual quality of display and/or the use of the video streams are taken into account. This is because, in such a known system, the client device only receives a single elementary video stream. The solution proposed in this article thus does not make it possible to share the overall bandwidth between several elementary video streams taking into account the visual display quality and/or the use of the video streams.

The present invention is directed to mitigating at least one of the drawbacks mentioned above.

In the first place the present invention aims to provide a method of sending at least one item of information relative to a multimedia data stream in a communication network, characterized in that it comprises the following steps carried out on a server device capable of sending the multimedia data stream over the network:

obtaining at least one item of information relative to the data stream, said at least one item of information relative to the data stream comprising an item of information on a visual quality of the multimedia data stream and an item of information making it possible to obtain the bandwidth necessary for sending the stream with that visual quality, sending said at least one obtained item of information over the communication network to a client device.

The method of sending an item of information relative to a multimedia data stream in a communication network according to the invention makes it possible to inform at least one client of one or more qualities of a data stream that the server is capable of providing. The quality is described by means of an item of information comprising an item of information on the visual quality of the data stream and an item of information on the bandwidth necessary for sending that stream.

In this way, the client can determine the quality of the data stream that it desires.

According to a particular feature, the method comprises the following steps:

receiving at least one item of data, said at least one item of data making it possible to determine an item of information relative to the data stream selected by the client device from said at least one sent item of information relative to the data stream, and sending the multimedia data stream on the basis of said selected item of information.

According to another particular feature, said at least one item of data is at least one item of information relative to the data stream.

According to still another particular feature, the method comprises the following steps:

receiving at least one item of data, said at least one item of data making it possible to determine a visual quality of the multimedia data stream and the bandwidth necessary for sending the stream with that visual quality, determining, on the basis of said item of data, said visual quality and the bandwidth necessary for sending the stream with that visual quality; and sending the multimedia data stream on the basis of the determined visual quality and bandwidth.

According to these different features, the server receives, from a client to whom it has sent at least one item of quality information, an item of data which enables it to determine the quality of the data stream that the client desires. The server converts the data stream so as to meet the requested quality.

The item of data sent by the client to the server is, in particular, an item of information relative to the data stream sent beforehand by the server.

In a variant embodiment, the item of data sent by the client is an item of information on the basis of which the server determines a visual quality and the necessary bandwidth for sending the stream.

According to a possible feature, the sending of the multimedia data stream is carried out on the basis of the item of information on the bandwidth selected by the client device.

According to this feature, the stream is sent in accordance with the bandwidth selected by the client device.

According to a feature that may be envisaged, said at least one item of information relative to the data stream is obtained and sent periodically to the client device.

Thus, it is possible to adapt periodically to the requests of the client device and to the conditions of the communication network, which makes it possible to improve the quality of service.

According to one embodiment, the server periodically sends the items of quality information which it is able to send so as to inform the clients of the capabilities of the server in terms of quality.

In this way, the method takes into account the variations occurring over time in the multimedia data stream to send.

According to a possible feature, the item of visual quality information is determined by the calculation of the signal to noise ratio.

According to one embodiment, the method further comprises the following steps:

sending a multimedia data stream with a current visual quality, obtaining at least one item of information comprising an item of information on a visual quality higher than the current visual quality, obtaining at least one item of information comprising an item of information on a visual quality lower than the current visual quality, and sending said obtained items of information over the network to a client device.

According to this embodiment, the server sends the data stream and in parallel, or practically in parallel, obtains items of information on a higher visual quality and a lower visual quality than the data stream that is sent. Thus, the client can readjust the quality of the stream on the basis of those items of information.

According to a possible feature, the item of information relative to the data stream further comprises the compression rate.

According to another possible feature, the item of information relative to the data stream further comprises the compression technique.

According to a feature that may be envisaged, the method further comprises a step of storing the items of information relative to the data stream in an information table.

The information table makes it possible in particular to store the items of quality information sent to the clients.

According to a particular embodiment, said at least one obtained item of information is sent by means of control packets of the RTP protocol.

According to another particular embodiment, said at least one obtained item of information is inserted in at least one field of the coding format of the data stream prior to the sending of said at least one item of information.

The present invention is also directed to providing a method of receiving items of information relative to a plurality of multimedia data streams coming from at least one server device of a communication network, characterized in that it comprises the following steps carried out on a client device capable of receiving a plurality of multimedia data streams from the network:

receiving, from at least one server device at least one item of information relative to the data stream capable of being sent by said at least one server device, said at least one item of information comprising an item of information on a visual quality of the multimedia data stream and an item of information making it possible to obtain the bandwidth necessary for sending the stream with that visual quality, sharing the bandwidth available on the network between the multimedia data streams capable of being received by the client device on the basis of said at least one item of information received.

According to the method of reception in accordance with the invention, the client receives items of information on quality of different streams from different servers, and on the basis of those items of information shares the bandwidth.

In this way, the quality of a group of displayed data streams is optimized overall.

Similarly, the sharing of the bandwidth between several data streams is carried out taking into account the possible qualities and the characteristics of the network.

According to a possible feature, the sharing is furthermore carried out on the basis of a predetermined criterion.

According to one embodiment, the predetermined criterion depends on the selection of a main multimedia data stream.

According to this feature, the sharing of the bandwidth also takes into account the use of those data streams by the user. In this way, the qualities of several data streams which have the same use are harmonized, whereas the quality of the most important data streams is increased.

According to a feature that may be envisaged, said at least one item of information relative to the data stream sent by said at least one server device is received periodically.

According to this feature, the user is permitted to readjust the quality of the different data streams at any time.

According to a particular embodiment, the method further comprises the following steps:

on the basis of items of information on different possible qualities of the same multimedia data stream, selecting an item of information on a given visual quality, sending at least one item of data to the corresponding server device enabling determination to be made of the item of information relative to the data stream selected from said at least one received item of information relative to the data stream, and receiving the multimedia data stream on the basis of said received item of information.

According to this embodiment, the client sends the server data enabling it to determine the quality of the data stream desired by the client.

According to a possible feature, said at least one item of data is at least one item of information relative to the data stream.

According to a feature that may be envisaged, the method comprises a step of sending at least one item of data, said at least one item of data making it possible to determine a visual quality of the multimedia data stream and the bandwidth necessary for sending the stream with that visual quality.

According to a possible particular feature, the item of information relative to the data stream further comprises the compression rate.

According to another particular feature, the item of information relative to the data stream further comprises the compression technique.

According to an embodiment that may also be envisaged, said at least one obtained item of information is received by means of control packets of the RTP protocol.

According to a possible feature, said at least one obtained item of information is inserted into at least one field of the coding format of the received data stream.

In a complementary manner, the invention is also directed to a device for sending at least one item of information relative to a multimedia data stream in a communication network, characterized in that it comprises the following means implemented on a server device capable of sending the multimedia data stream over the network:

means for obtaining at least one item of information relative to the data stream, said at least one item of information relative to the data stream comprising an item of information on a visual quality of the multimedia data stream and an item of information making it possible to obtain the bandwidth necessary for sending the stream with that visual quality, means for sending said at least one obtained item of information over the communication network to a client device.

This device has the same advantages as the method of sending at least one item of information relative to a multimedia data stream briefly described above.

The present invention is also directed to providing a device for receiving items of information relative to a plurality of multimedia data streams coming from at least one server device of a communication network, characterized in that it comprises the following means implemented on a client device capable of receiving a plurality of multimedia data streams from the network:

means for receiving, from at least one server device at least one item of information relative to the data stream capable of being sent by said at least one server device, said at least one item of information comprising an item of information on a visual quality of the multimedia data stream and an item of information making it possible to obtain the bandwidth necessary for sending the stream with that visual quality, means for sharing the bandwidth available on the network between the multimedia data streams capable of being received by the client device on the basis of said at least one item of information received.

This device has the same advantages as the method of receiving items of information relative to a plurality of multimedia data streams briefly described above and these will therefore not be reviewed here.

According to other aspects, the invention also concerns computer programs for an implementation of the methods of the invention described briefly above.

Other features and advantages of the invention will appear in the light of the following description and of the drawings in which:

FIG. 1 diagrammatically represents a distributed network for digital data exchanges;

FIGS. 6A and 6B are block diagrams illustrating the method in accordance with the invention;

FIGS. 7A and 7B represent tables of visual quality of the video streams at the server end and at the client end in accordance with the invention.

Figure 1:
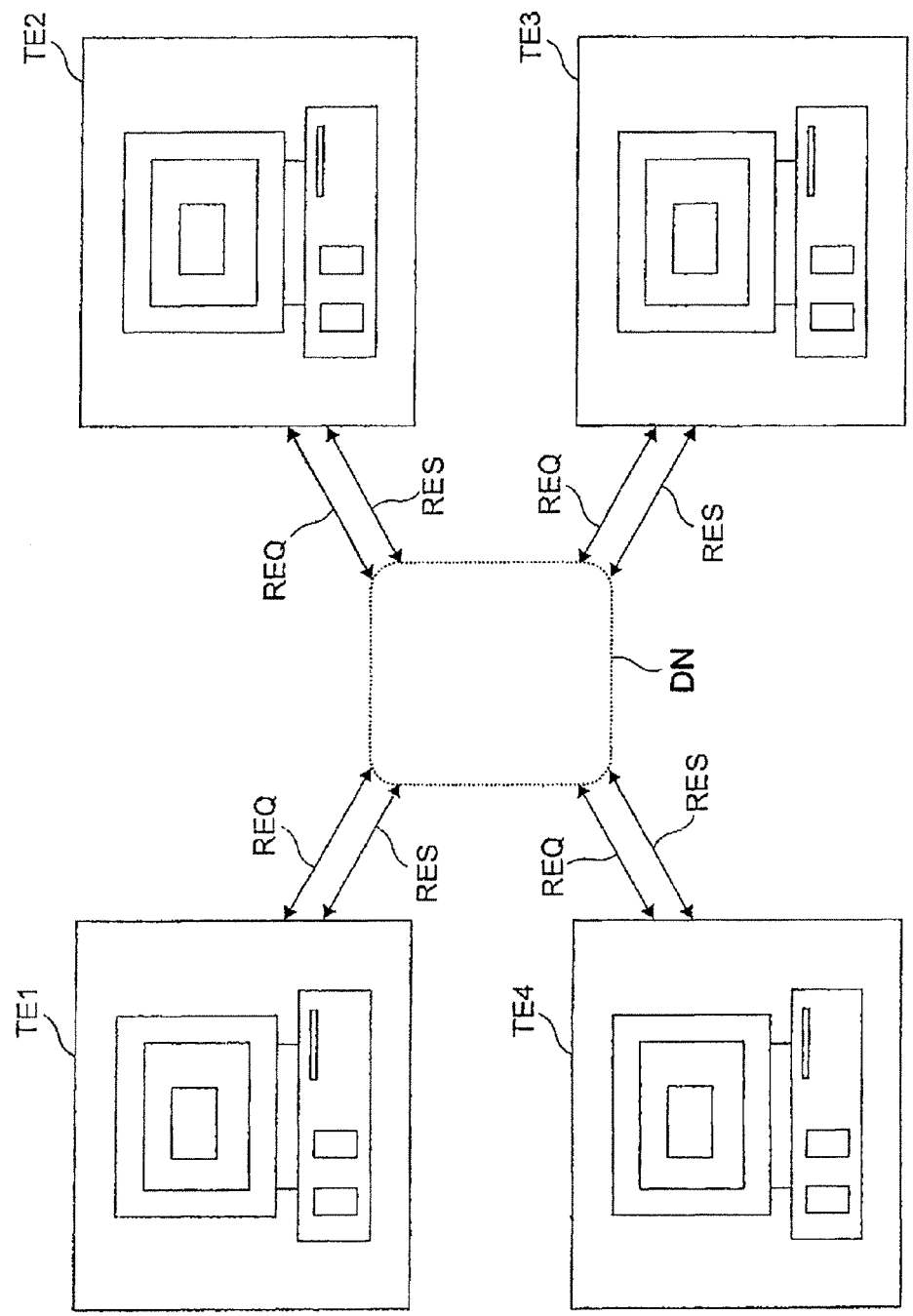
Figure 9:
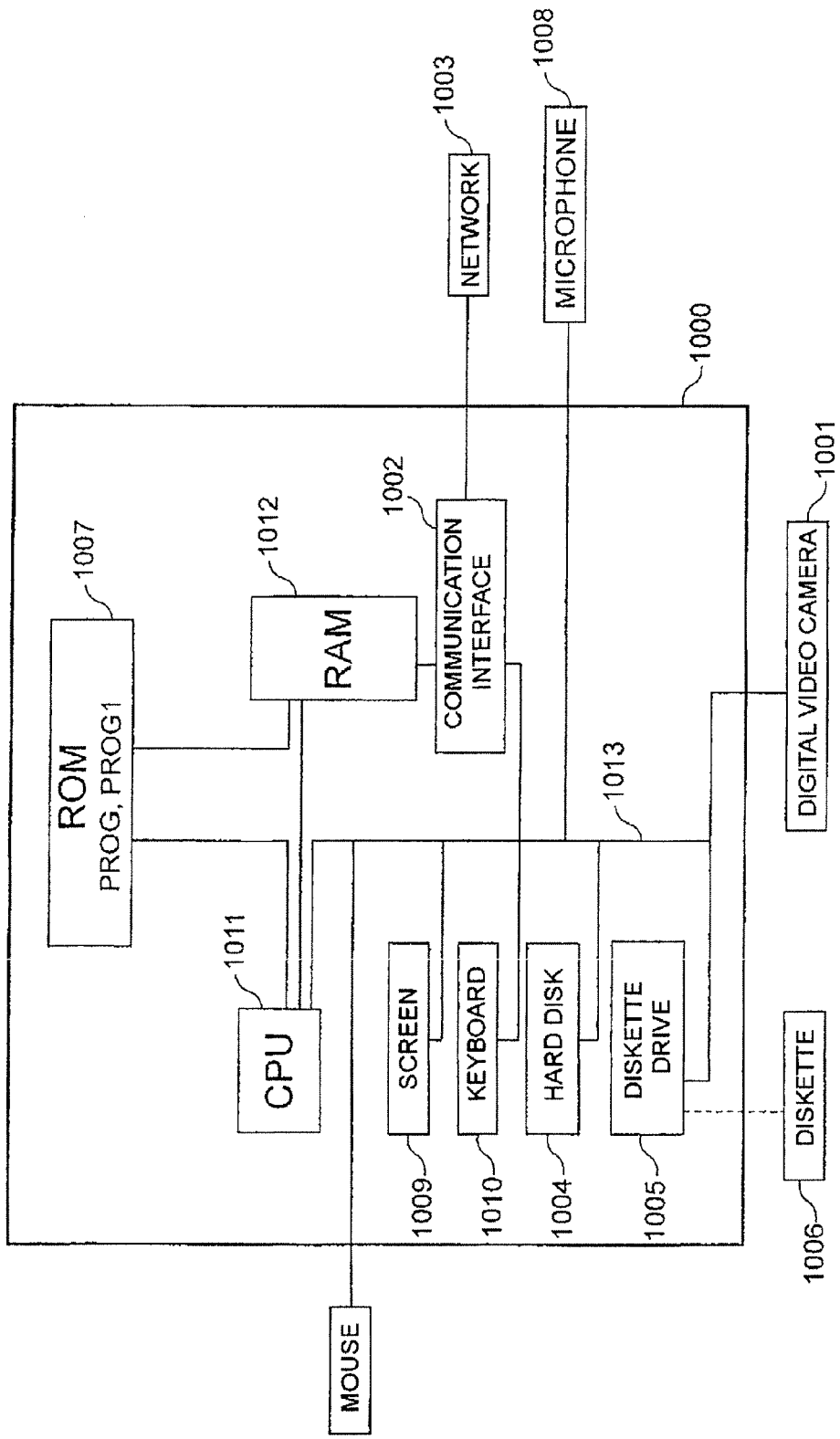

FIG. 9 diagrammatically represents a client device adapted to implement the method according to the invention;

FIG. 1 is a diagrammatic representation of a distributed network DN for data exchanges. Such a network DN comprises a set of terminals TE (itemized TE1 to TE4). Each terminal TE is connected to the network DN and has communication means for sending requests REQ and for receiving replies RES. The network DN may be for example a wireless network (WiFi/802.11a or b or g), or an Ethernet network, or the Internet.

It will be noted that the invention applies to the transmission of multimedia digital data via the distributed communication network DN represented in FIG. 1.

The multimedia data concerned constitute a digital video sequence in the embodiment.

The terminals TE may for example take the form of a device represented in FIG. 9 and which will be described later.

Each terminal TE comprises, in particular, a volatile storage memory (cache memory), a file server and a man-machine interface which enables requests REQ to be sent from the user to other terminals TE on the communication network. According to the invention, the terminals may communicate between them via the overall network.

Figure 2:
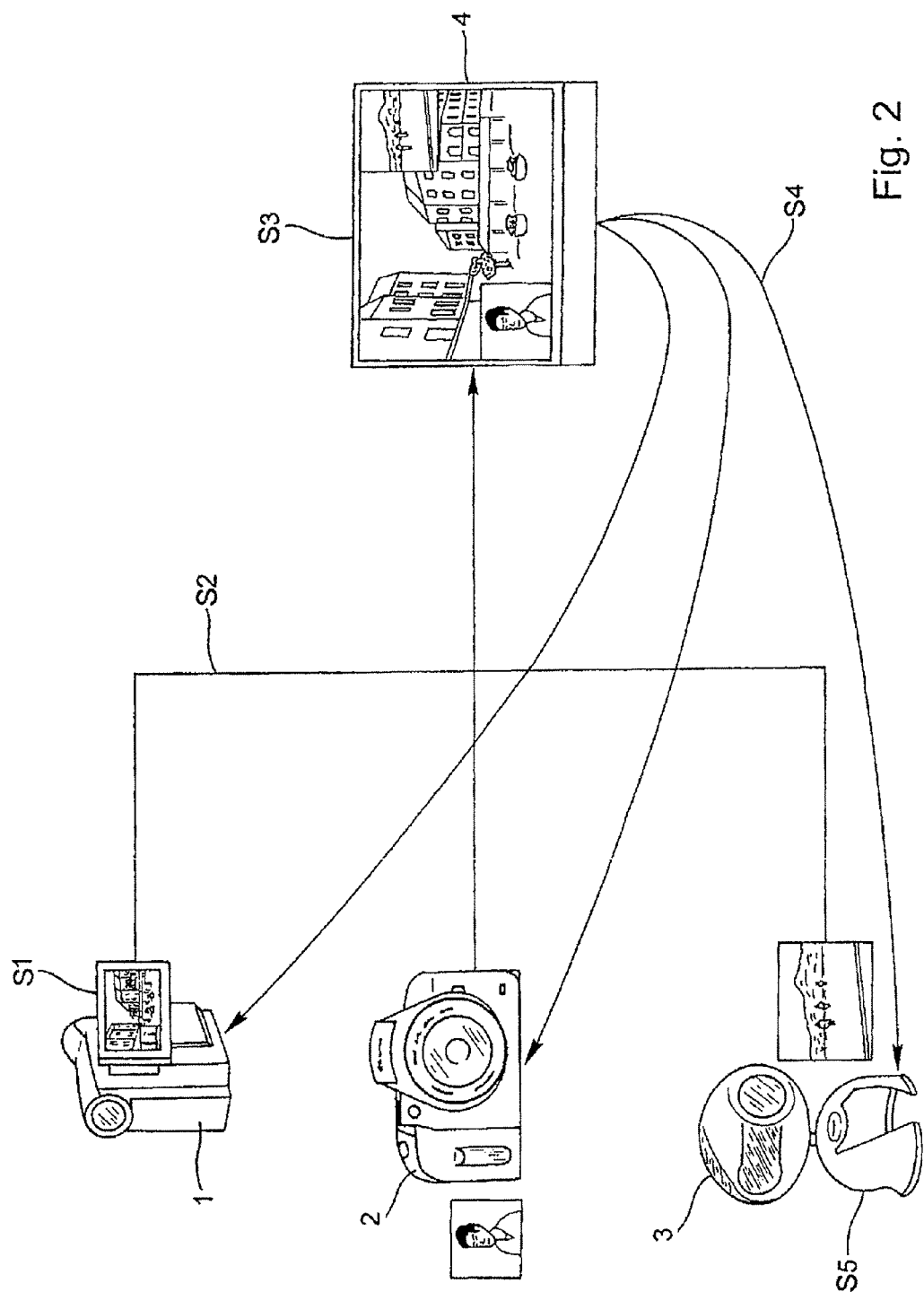
FIG. 2 is a diagrammatic representation of the steps of the method of sharing bandwidth in accordance with the invention.

With reference to FIG. 2, the main steps are represented of the method of sending an item of information relative to a multimedia data stream and of the method of receiving information relative to a plurality of multimedia data streams from at least one server device in accordance with the invention in a context of use chosen by way of non-limiting example.

A user is situated here in front of a client device equipped with a screen 4 which is connected to the network DN. Several server apparatuses 1, 2, 3 generating multimedia data streams are connected to that same network DN, the multimedia data streams being elementary video streams according to the example considered. For example, there may be a video camera 1, a stills camera 2 and one or more video surveillance cameras 3. The user configures the screen 4 to simultaneously view three elementary video streams: a main one and two in miniature. An example of configuration of the screen is described with reference to FIGS. 4A and 4B.

In a prior step of starting the application, the user configures the screen of the client device 4 such that the client device connects to the different server devices 1, 2, 3 and sends to each of them a request REQ asking for a particular video with certain parameters such as the size of display and the maximum rate.

In this context, each server apparatus 1, 2, 3 repetitively implements the sending method according to the invention.

During the sending of the elementary video stream, the server apparatus 1, 2 or 3 performs, in a first step S1, an analysis of the visual quality of the video and tests different coding possibilities as described with reference to FIGS. 5A and 5B.

This enables it to obtain a list of items of information relative to the video. These items of information comprise, in particular, an item of information on a visual quality of the video and an item of information on the bandwidth necessary for sending the video with that visual quality. These items of information may further comprise the compression rate and the compression technique for the video. These different choices are locally stored at each server device in the form of a server table TA described with reference to FIG. 7A.

In a second step S2, the items of information relative to the video concerning the possibilities for visual quality of the video and for bandwidth necessary for sending the video with that visual quality are sent over the communication network to the client device 4 with the video.

In step S3, the client device 4 receives the items of information relative to the video from the server device 1, 2 or 3 and stores them in a client decision table TB (FIG. 7B). It may then decide as to the sharing of the elementary bandwidths between all the elementary videos as described with reference to FIG. 8. In this context, the client device 4 implements the receiving method in accordance with the invention.

During the step S4, the result of the selection of an item of information relative to the video by the client device 4 concerning a video visual quality and/or a corresponding bandwidth is sent to the server device 1, 2 or 3. Lastly, at the step S5, the server device 1, 2 or 3 starts by retrieving the parameters stored in the local server table TA corresponding to the client request (FIG. 7A). The server device 1, 2, 3 next adapts the bandwidth of the video in accordance with those parameters (FIGS. 5A and 5B).

Figure 3:
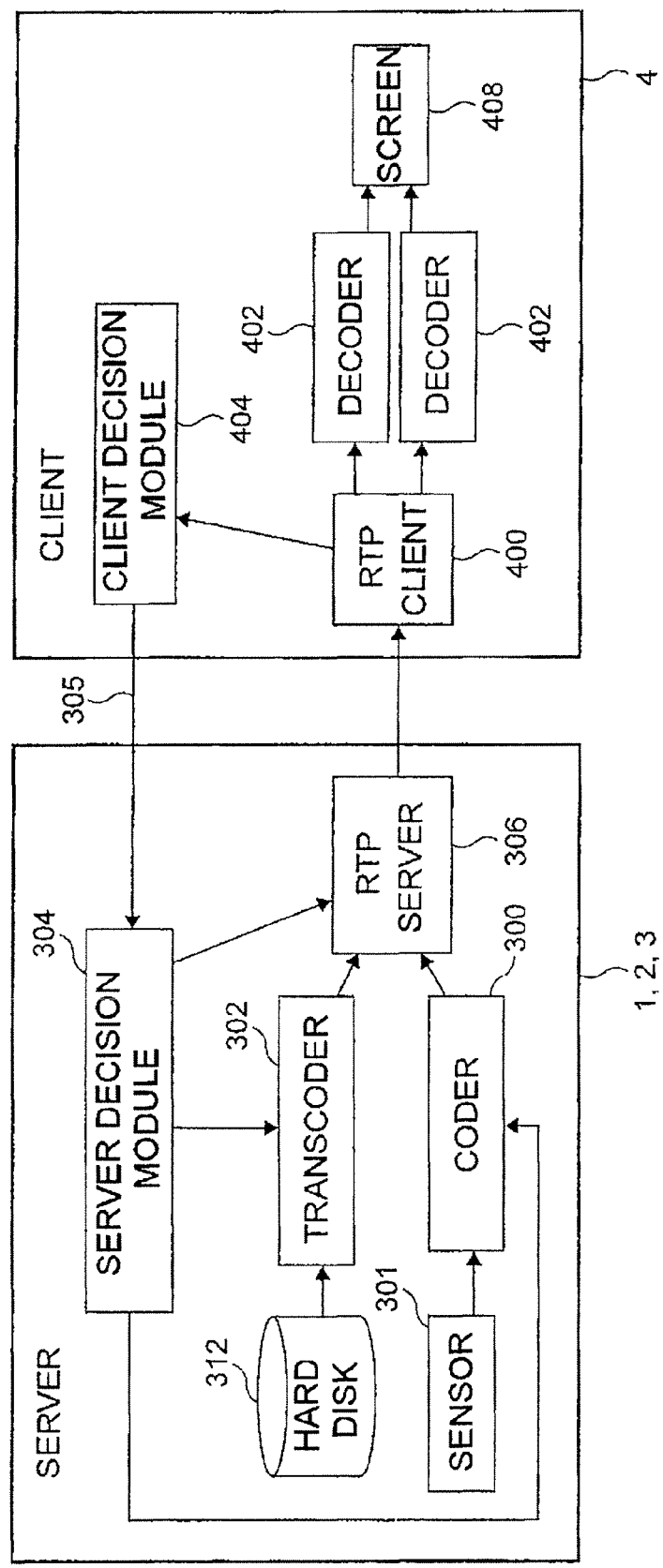
FIG. 3 is a diagrammatic representation of the exchange of data between a client device and a server device in accordance with the invention.

With reference to FIG. 3, the hardware or software architecture of the server devices 1, 2 or 3 and of the client device 4 is described. A single server device 1, 2, 3 is represented but other server devices may exist with the same architecture or an equivalent architecture and be connected to the same client device.

In practice, the server device may obtain the video stream in two ways.

First of all, the video stream may be captured live by a sensor 301 then coded in real time by a coder 300, the coder 300 taking on the task of compressing the video while adapting the elementary bandwidth.

Secondly, the video stream may be stored in a form already compressed in a storage memory (for example a hard disk 312). In this second case, a transcoder module 302 is used to modify the coding of the stored video stream and adapt the elementary bandwidth.

The coder 300 or the transcoder 302 adapt the rate of the video using the methods described with reference to FIGS. 5A and 5B.

The units 300/302 are controlled by a decision/rate control module 304 which chooses the coding parameters. The algorithm used by the module 304 is described with reference to FIGS. 6A and 6B.

The compressed video is then supplied to a server module RTP 306 which takes on the task of creating packets and of sending them over the network DN using, for example, RTP (Real-time Transport Protocol) over UDP/IP (User Datagram Protocol/Internet Protocol). Each data packet is numbered, which then enables the client device to reconstruct the video stream.

RTCP control packets of SR (Sender Report) type may be used to enable the server device to send additional items of information. The decision module 304 for sending the items of information relative to the video comprising items of information on visual qualities of the video and associated items of information on the bandwidth necessary for sending the video with those visual qualities to the client device 4, will thus supply them to the RTP server 306 which then sends them in the RTCP packets.

As a variant, another method consists of adding items of information relative to the video to the video stream. For this use may be made of the possibilities afforded by the MPEG4 format which reserves certain fields (such as the field "user data") for additional information.

Another variant may consist of using a direct communication link over TCP/IP between the decision modules at the server end 304 and at the client end 404.

At the client end 4, an RTP client module 400 receives the packets sent by the server devices 1, 2, 3. Using the headers of the RTP packets, the packets are grouped to recreate the video streams sent by the server devices, and each stream may then be supplied to a decoder 402. The decoder 402 decompresses the video and may supply the images to display on the screen 408. The latter receives and displays several videos.

The items of control information added to the video stream by the server device are also received by the RTP client module 400. The different packet headers enable the client device to distinguish them from the normal video stream and thus to send them to the client decision module 404. The algorithm of the client decision module 404 is described with reference to FIG. 8.

The items of information relative to the video that are selected by the client decision module 404 (the choices of bandwidth and visual quality) are sent from the client device to the server device. Specific messages may be used in the control part of the RTP protocol (RR or "Receiver Report" messages) to send items of information from the client device to the server device. In this case, the client decision module 404 sends those items of information to the RTP client module 400 which sends them to the RTP server module 306. The latter decodes the received packets and sends the information to the decision module of the server device 304.

Another solution (represented in FIG. 3) consists of using direct communication 305 of TCP/IP type between the two decision modules 304 and 404. The client module 404 may thus directly send its decision to the server module 304.

Such architecture is an example of possible architecture for the invention. Other variants are of course possible under the invention. It is possible for example to have the client decision modules 404 distributed between several machines: a display (for example a television set), a reception and decoding box (for example a decoder box connected to the television set), and the decision module may be situated on a third machine (for example a specific WiFi point of access implementing the invention).

Figure 4A:
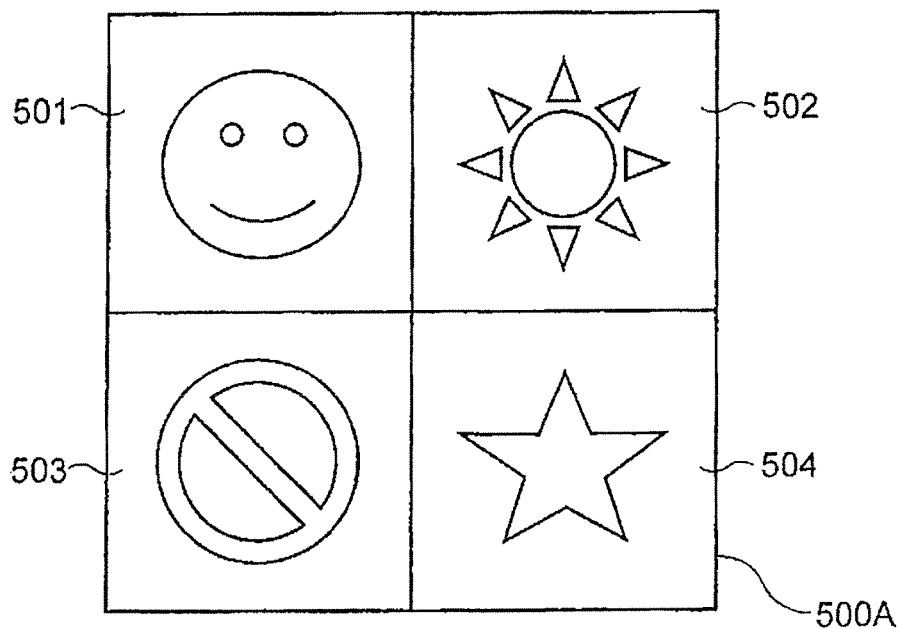
FIGS. 4A and 4B are examples of diagrammatic representation of a client device display screen in accordance with the invention.
Figure 4B:
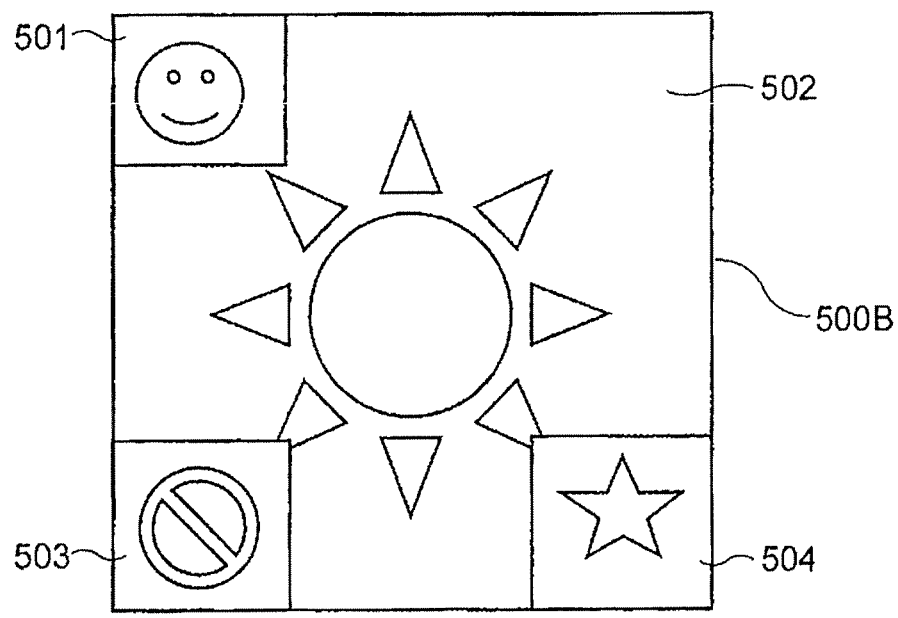

With reference to FIGS. 4A and 4B, an example of display of the different received video streams on the client station has been represented. Two possibilities are represented by way of example:

In a first case (FIG. 4A), the videos are displayed in mosaic form 500A. Each video has a screen portion 500A of the same size. A video 502 may be selected for example to have the audio output. This video 502 may be designated directly by the user by selecting its number on the remote control.

In a second case (FIG. 4B) one of the videos 502 is represented at the full size of the screen 500B, the other videos 501, 503, 504 being displayed in miniature. As in the first case of FIG. 4A, the user may change the main image by selecting its number on the remote control.

In both cases, the visual qualities of the videos 501, 503 and 504 are similar: they each have the same size on the screen. The visual quality of the video 502 is better, since it has been selected by the user. This is because, as the user's attention is directed to the video 502, the visual quality of that video must be high.

Other ways to display the different videos and to select them may thus be implemented without this modifying the invention.

With reference to FIG. 5, the adaptation of the rate of a video will now be described.

FIGS. 6A and 6B are diagrammatic representations of a sequence of images that are compressed with a video compression format such as H.264 or MPEG-4 for example. These are known formats, based on the application of Discrete Cosine Transformation (DCT) by blocks of the sequence and on motion compensation.

Conventionally, a sequence coded in such a format contains I or INTRA type images, which are independently decodable, predicted images P and bi-predicted images B. Groups of images (GOPs) are defined that are constituted by one I image followed by a predetermined number of P and B type images.

The size of the I, P and B images is very variable. Generally the I image is less compressed (since it does not use motion compensation), the P images are better compressed and the B images are the smallest. It is the size of each image which is represented with reference to FIGS. 5A and 5B. The calculation of the rate of a video must thus be calculated as an average M over a sequence and not image by image.

Several parameters may be used to modify the compression rate of a video.

For example, the quantization step size may be modified, for the intra blocks and the inter blocks.

Certain images may be deleted from the video, which corresponds to the change in display frequency. The structure of the GOP may thus be modified.

It is also possible to change the spatial resolution of the images.

The compression rate obtained for a set of parameters is not fixed since the result of the compression depends on the type of image and video and on the content of the scene. Thus a film with a static scene or a small object with regular translational movement is strongly compressed, whereas an action movie, for example, still generates a large quantity of data. The compression rate depends on the quantity of non-redundant information in the original sequence.

The techniques described may be applied at the time of a coding or transcoding operation of a video.

In the case of a coding operation, a digital sensor generates images which are then coded. At the start of a group of images GOP, an I image is generated, then the following images are compressed as P (or B according to the structure of the GOP). To obtain a constant rate, the result of the compression is taken into account and the compression parameters are dynamically adapted to each image (or to each macroblock) to attain the average rate set.

Figures 5A, 5B:
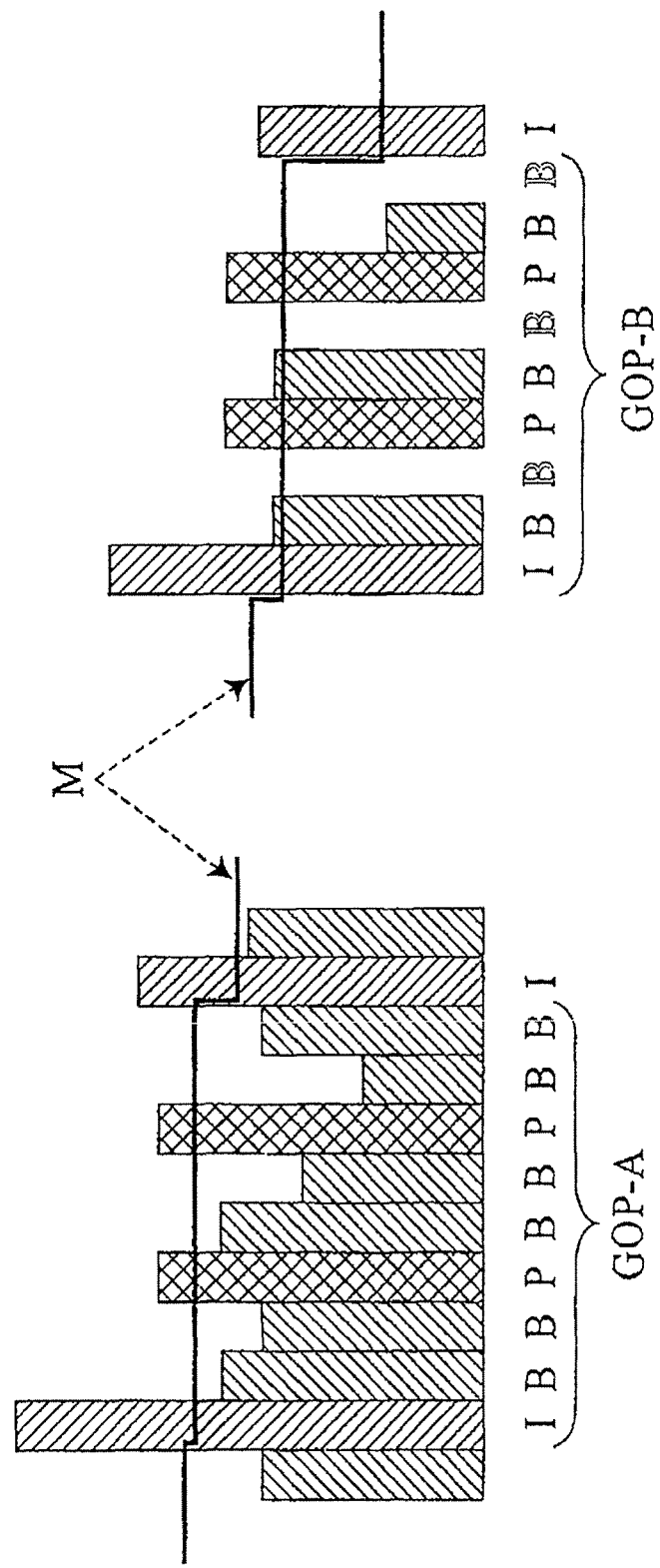
FIGS. 5A and 5B are diagrammatic representations illustrating the size of each image of a group of compressed images.

In the case of a transcoding operation, the video represented in FIG. 5A has already been coded previously but it is desired to change its compression rate to reduce the average rate M of the sequence. The simplest technique, but which is more costly in calculation time, consists of decoding the video then re-compressing it with a different compression rate. A more efficient technique consists of partially decoding the video and of requantizing it in order to increase the compression rate while re-using the motion vectors without modifying them. This technique makes it possible to lower the size of each image I, P or B. Another technique consists of deleting certain images. The type B images may simply be removed since they are not re-used by other images. As in the case of the coding, the compression parameters are dynamically modified at each macroblock depending on the compressions obtained previously to attain the average rate set. The result of the transcoding is represented in FIG. 5B: certain B images have been deleted and the remaining images have been compressed more strongly to obtain a lower average rate M than the initial video.

Other techniques for bandwidth compression and adaptation may be used. For example, certain forms of coding make it possible to have coding at several levels (scalable coding). The video is then composed of several layers, each layer adding additional information (thus more rate) and quality. The adaptation of the rate then consists of selecting the number of layers desired.

It is possible to measure the visual quality of the compressed video in several ways. The most classical way is the calculation of the signal to noise ratio.

An image that is compressed then decompressed can be compared to the original image. The Mean Square Error (MSE) on a color component of an image after decoding (for example, the luminance, denoted X(i,j)) is calculated by the formula:

$$MSE = \frac{1}{W \times H} \sum_{j=1}^{W} \sum_{i=1}^{H} (X(i,j) - \tilde{X}(i,j))^2$$

where W is the width of the image, H its height, and $\tilde{X}$ is the decompressed value of the same component for the same point on the original image.

The Peak Signal to Noise Ratio (PSNR) is then calculated using the following formula:

PSNR=20 Log 10(255/RMSE)

where RMSE is the root mean square error.

This metric makes it possible to obtain an objective measurement of the distortion of an image and is easy to calculate.

This measurement may then be applied to a video sequence of N images by calculating its average:

$$\overline{PSNR} = \frac{1}{N} \sum_{i=1}^{N} PSNR_i$$

And its variance:

$$\sigma_{PSNR} = \frac{1}{N} \sqrt{\sum_{i=1}^{N} (x_i^2 - \overline{PSNR}^2)}$$

The two values make it possible to obtain an evaluation of the quality of a video: the average of the signal to noise ratio PSNR gives an indication as to the average visual quality of the images whereas the variance makes it possible to know whether the quality of the images is very variable in the video. This latter parameter is important since large variations in quality of the images give a video that is unpleasant to watch and thus of lower quality than a video with a small variance, even with a less good average signal to noise ratio PSNR.

The variance between the signal to noise ratios PSNR of several videos is useful for evaluating the dispersion of quality of the videos. This value will be used in the algorithm described in FIG. 8.

Where certain images are deleted by the compression, it is considered that the preceding image remains displayed. The signal to noise ratio PSNR is thus measured of the preceding compressed image relative to that image.

With reference to FIG. 6A, the part of the algorithm is represented that is implemented on the server device according to one embodiment of the invention in the corresponding decision module. The sending of the video is not interrupted when that portion of the algorithm according to the invention is executed.

In a first step S610, the server device decides to send items of information relative to the video comprising items of information on the visual qualities of the video and associated items of information on the bandwidth necessary for sending the video in accordance with the visual qualities to the client device. These items of information are for example measurements of signal to noise ratio PSNR estimated on the basis of different compression rates. This decision (the sending of items of information relative to the video and the quantity of information sent) may be taken on the basis of different criteria.

For example, the decision may be taken at the start of the video to enable the client device to select the optimum visual quality before starting to send.

As a variant, according to one embodiment of the invention, it may be taken periodically (for example every 5 seconds) to enable regular adaptation of the visual quality.

In another variant, the sending of information may be implemented in a manner synchronized with the RTCP control messages, with the Sender Report message which makes it possible to have a rapid sending of the information relative to the video without modifying the rhythm of sending RTCP messages.

Lastly, according to still another variant, the sending of information relative to the video is carried out depending on the video. For example, if a change of scene is detected in the video, the quality may be greatly modified. This necessitates an analysis of the video (for example a measurement of the motion vectors to detect a large change). This analysis may be made in advance in the case of stored videos.

The server device starts by erasing the server table TA (FIG. 7A) of the previous results (step S615). This is because the data related to the previous analysis are no longer relevant and must thus be erased.

At the step S620, the current video sequence is compressed. The rate control algorithm chooses the quantization parameters on the basis of a rate-distortion model and on the basis of the overall bandwidth available at the time of the compression. By way of example, known models used in the context of MPEG compression are TMN-5 or TMN-8.

Next, at step S625, other rate-distortion values (still given by the rate control module) are evaluated. These values may be chosen on the basis of the current parameters if the video is already in course of being played.

The server device attempts at least to obtain a higher compression rate and a lower compression rate than the current compression in order to give a better choice for decision by the client device. If at the time of its last message, the client device explicitly requested an increase or a reduction in visual quality (request stored at step S705, FIG. 6B) the server device then attempts to choose more rate-distortion measurements in the direction requested by the client device. The number of measurements can thus be modified by the client device.

The compression parameters (for example, the quantization step size, the time frequency, etc.) corresponding to the different values of the rate-distortion model as well as the values of quality and rate are stored in the table 8 at the server table TA end (FIG. 7A).

When a sufficient number of measurements has been obtained, the algorithm proceeds to step S630. In this step, the items of information relative to the data stream in the form of rate-distortion measurements are put into the form of RTCP packets and sent to the client device. The server thus sends several possibilities of quality and rate. As a variant embodiment, instead of explicitly sending the rate measurement, the server can send the parameters of the rate-distortion model used by the rate calculation algorithm. The client may thus re-calculate the rate on the basis of the quantization parameter. The algorithm then stands by for the response from the client device (step S640).

Later, each server device receives the requests from the client (step S710, FIG. 6B). These requests may be constraints of bandwidth or of quality or a selection of one of the measurements sent. As explained in detail later with reference to FIG. 8, the client device calculates the respective bandwidth which it authorizes for each server device, on the basis of the different rate-distortion values received from the different server devices. This bandwidth is linked to the video visual quality it wishes to obtain from the different server devices. The requests of the client are stored at step S705.

Two cases may arise:

The first case concerns the video in real time. In this first case, the rate/distortion measurements (with the corresponding compression parameters) are no longer totally up to date since the coding is made in real time. In this case, the server uses the table TA (step 720) to retrieve the measurement selected by the client and thus deduces therefrom the bandwidth constraint. A new rate-distortion measurement must then be made at the time of the video compression (step S730).

The second case concerns the video stored beforehand. In this last case, the rate-distortion measurements (with the corresponding compression parameters) were made with a temporal advance. Due to this fact, the stored compression values may apply to the images in course of compression/sending. These compression values are thus retrieved (at step S720) on the basis of the item of data sent by the client (rate or quality or selection of a measurement) and directly applied (at step S730) during the transcoding of the video to the bandwidth constraints given by the client device.

The data structures used in the server device and the client device are respectively presented in the tables TA and TB of FIGS. 7A and 7B.

The server device has a server table TA making it possible to store the results of compression simulation or by a rate-distortion model, which makes it possible to re-use them when the client device has selected certain parameters (very useful in the case of transcoding if the server device can get ahead but less used in the case of realtime video since these parameters must be re-evaluated).

Each line of the server table TA (FIG. 7A) contains
the bandwidth B necessary (or the compression rate), this measurement characterizing the quantity of information which is sent,
the visual quality Q of the video: in the algorithm provided, this is the measurement of average signal to noise ratio PSNR and of its variance;
the quantization step size q used to compress the sequence;
the frequency f of the images used for the compressed video; and
the resolution r used for the compressed video.

The client device keeps up to date a client table TB (FIG. 7B) containing the different possibilities for each video stream received.

Each line is associated with a video V and contains:
the identification of the video idV;
an indicator iv of the type of use: normal (corresponds to a miniature image 501, 503 or 504 in FIG. 4A) or priority (image 502 in FIG. 4B);
the list of the proposals po of the server device as they were sent at the step (S630) containing the different possibilities for quality and rate;
the parameters ps selected by the client device.

Note that in one embodiment of the invention, the visual quality is measured by the average signal to noise ratio PSNR, which has the advantage of being easy to calculate. Nevertheless, other quality measurements, in particular using a psycho-visual quality metric, could be implemented as a variant.

Figure 8:
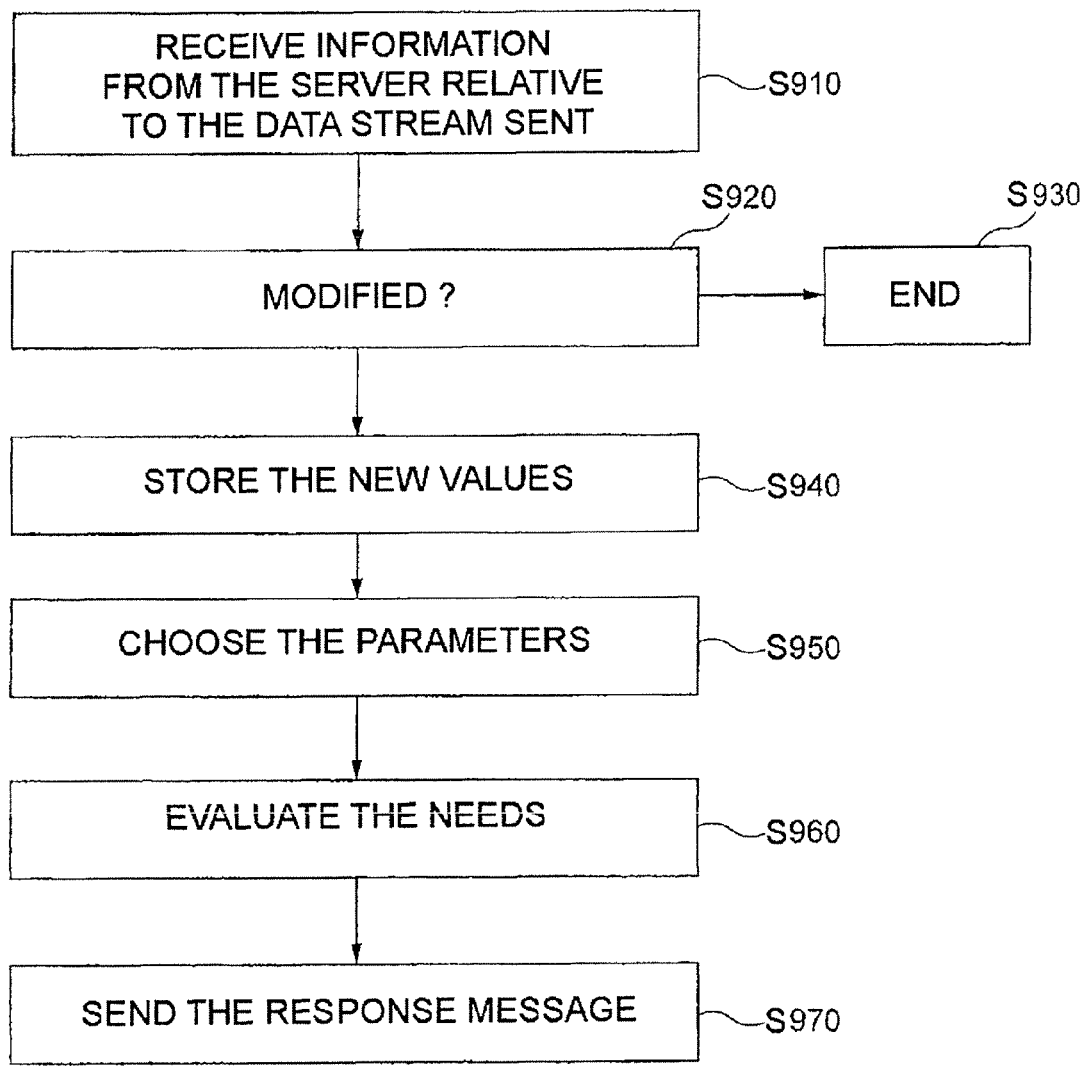
FIG. 8 is a block diagram illustrating the modification of the visual quality of an elementary stream.

The part of the sharing algorithm executed by the decision module of the client 304 is described with reference to FIG. 8.

In step S910, the client device receives the information relative to the stream containing the items of information relative to the parameters of visual quality and associated rate sent (step S630) by each server device.

The client device compares the values received relative to those already stored in the client table TB (step S920) If the list received has not been modified with respect to the preceding list, the client table TB is not modified, the algorithm is terminated (step E920) and the client device stands by again for new messages from the server device.

Where the parameters have been modified, the new values are stored as replacement of the old ones in the client table (step S940).

The following step S950 makes it possible to select the parameters for each video received or to be received.

The selection is made using the data of the client table TB. For each video i, the client device has ni bandwidth Bj and quality Qj pairs. It is necessary to choose the bandwidth Bj for each video such that the sum of the elementary bandwidths is less than the overall bandwidth of the network:

$$\sum_{i=1}^{N} B_j < B$$

It is necessary to select the visual quality Qj of each video such that:
all the "normal" videos have a visual quality that is as close as possible (this may be evaluated by the variance of the visual qualities),
the priority video has a higher visual quality $Q_{prio}$, and
the total video quality of the videos is the best possible.

To manage to optimize all these criteria, one solution consists of creating a maximizing function representing the overall video quality of the videos taking into account these different parameters.

$$f = a_1 \sigma_{Normal} + a_2 \overline{Q}_{Normal} + a_3 Q_{prio}$$

where $\overline{Q}_{normal}$ is the average value of the "normal" video qualities and $\sigma_{normal}$ is the variance of these quality values.

The values a1, a2 and a3 are parameters which must be dimensioned: the value a1 must be negative to minimize the variance, whereas the values a2 and a3 are positive with the value a3 greater than the value of a2 to give greater importance to the priority video. As a first approximation −1, 1 and 2 may be taken.

The optimization of the function of visual quality is a problem of optimization under constraints. In that only the solutions sent by each server device can be chosen, and as it has been seen that each server only sends a limited number of solutions, the number of possible combinations of solutions is limited. A simple solution may thus be implemented which consists of listing all the combinations, and only keeping those which satisfy the bandwidth constraint and then choosing that which maximizes the visual quality function.

At the end of the step S950, the best possible choice of the parameters for visual quality and elementary bandwidth has been obtained if a solution is possible. An item of information enabling the server to retrieve the two parameters per video is placed in the message to send for each video: this may be the value of quality or bandwidth or an identifier of one of the choices sent by the server.

At the step S960, the method in accordance with the invention seeks to evaluate whether certain server devices must further specify their choices, that is to say propose more solutions. This may be useful if the choices proposed by a server device are not well proportioned compared with the others. Several cases may for example be of interest:

no solution has been found in step S950, since the bandwidths are too great. In this case, the client device adds a request for lower bandwidth to the message for each video, one of the normal videos has a very different visual quality from the others, and the server device offers no value close to the others. In this case the client device may request other values increasing or reducing the visual quality for that video, the server device of the main video does not offer any better visual quality, the client device requests greater visual quality for that video.

The last step S970 consists of sending the messages constituted by the values for visual quality and elementary bandwidth for each video, and the indicator for the video calculated at step S960. Each message is then sent to the corresponding server device.

With reference to FIG. 9, a device capable of operating as a device for sending at least one item of information relative to a multimedia data stream and/or as a device for receiving items of information relative to a plurality of multimedia data streams from at least one server device of a communication network according to the invention will now be described in terms of its hardware configuration.

The information processing device of FIG. 9 has all the means necessary for the implementation of the method for sending at least one item of information relative to a multimedia data stream in a communication network and/or of the method of receiving items of information relative to a plurality of multimedia data streams from at least one server device of a communication network according to the invention.

According to the embodiment chosen, this device 1000 may for example be a micro-computer, a workstation, a digital assistant, a mobile telephone, a digital video camera, a stills camera, a video surveillance camera (Webcam), a DVD reader or a multimedia server.

If this device does not directly incorporate digital image sensor, it may optionally be connected to different peripherals such as a digital video camera 1001 (or a scanner or any means for image acquisition or storage) connected to a graphics card and supplying the apparatus with multimedia data.

The micro-computer 1000 preferably comprises a communication interface 1002 connected to a network 1003, for example the Internet network, adapted to transmit digital information.

The micro-computer 1000 also comprises a storage means 1004, such as a hard disk, as well as a diskette drive 1005.

The diskette 1006 as well as the hard disk 1004 can contain software installation data of the invention as well as the code (program "Prog" and "Prog1") implementing the sending method according to the invention and the receiving method according to the invention which, once read by the micro-computer 1000, will be stored on the hard disk 1004.

According to a variant, the program or programs enabling device 800 to implement the invention are stored in a read only memory ROM 1007.

According to another variant, the program or programs are partly or wholly received via the communication network 1003 in order to be stored as stated.

The micro-computer 1000 may also be connected to a microphone 1008 through an input/output card (not shown). The micro-computer 1000 also comprises a screen 1009 for viewing the information to be processed and/or serving as an interface with the user, so that the user may for example parameterize certain processing modes using the keyboard 1010 or any other appropriate means, such as a mouse.

The central processing unit CPU 1011 executes the instructions relating to the implementation of the invention, which are stored in the read only memory ROM 1007 or in the other storage means described.

On powering up, the processing programs and methods stored in one of the non-volatile memories, for example the ROM 1007, are transferred into the random access memory RAM (or cache memory) 1012, which will then contain the executable code of the invention as well as the variables necessary for implementing the invention.

As a variant, the methods may be stored in different storage locations of the device 1000. Generally, an information storage means, which can be read by a computer or microprocessor, integrated or not into the device, and which may possibly be removable, stores a program of which the execution implements the sending and receiving methods. It is also possible to upgrade the embodiment of the invention, for example, by adding sending and receiving methods brought up to date or improved that are transmitted by the communication network 1003 or loaded via one or more diskettes 1006. Naturally, the diskettes 1006 may be replaced by any form of information carrier such as CD-ROM, or memory card.

A communication bus 1013 enables communication between the different elements of the micro-computer 1000 and the elements connected thereto. It will be noted that the representation of the bus 1013 is non-limiting. Thus the central processing unit CPU 1011 may, for example, communicate instructions to any element of the micro-computer 1000, directly or via another element of the micro-computer 1000.

It should be noted that the communication apparatus comprising the device according to the invention can also be a programmed apparatus. This apparatus then contains the code of the computer program or programs for example fixed in an application specific integrated circuit (ASIC).

Of course, the present invention is in no way limited to the embodiments described and represented, but encompasses, on the contrary, any variant form within the capability of the person skilled in the art.

The invention claimed is:

1. A method of sending at least one item of information relative to a multimedia data stream in a communication network from a server device to a client device that receives a plurality of multimedia data streams from different server devices, comprising the following steps carried out on one of the server devices capable of sending at least one of the multimedia data streams over the network:
    obtaining at least one item of information relative to the at least one of the multimedia data streams, said at least one item of information relative to the at least one of the multimedia data streams comprising visual quality information on a visual quality of the multimedia data stream, and bandwidth information making it possible to obtain the bandwidth necessary for sending the multimedia data stream with that visual quality;
    sending said at least one obtained item of information over the communication network to a client device; and
    receiving from the client device a request specifying a visual quality called priority visual quality and/or bandwidth for the multimedia data stream to be sent to the client device based on the management of the video quality and/or bandwidth of the multimedia video streams from the different servers transmitting their multimedia video stream simultaneously to the client device,
    wherein the priority visual quality is of a higher visual quality than the quality of the other multimedia video streams, and
    the visual qualities of the plurality of multimedia video streams received by the client device are represented by a metric based on the priority visual quality, the average value of the visual qualities of the other multimedia video streams simultaneously transmitted, and the variances of the visual qualities of the other multimedia video streams.

2. A sending method according to claim 1, further comprising the following steps:
    wherein said receiving step comprises receiving at least one item of data, said at least one item of data making it possible to determine an item of information relative to the multimedia data stream selected by the client device from said at least one sent item of information relative to the at least one of the multimedia data streams; and
    sending the multimedia data stream on the basis of said selected item of information.

3. A sending method according to claim 2, wherein said at least one item of data is at least one item of information relative to the data stream.

4. A sending method according to claim 1,
    wherein said receiving step comprises the step of receiving at least one item of data, said at least one item of data making it possible to determine a visual quality of the multimedia data stream and the bandwidth necessary for sending the stream with that visual quality, said method further comprising the steps of:
    determining, on the basis of said item of data, said visual quality and the bandwidth necessary for sending the stream with that visual quality; and
    sending the multimedia data stream on the basis of the determined visual quality and bandwidth.

5. A sending method according to claim 4, wherein the sending of the multimedia data stream is carried out on the basis of the bandwidth information on the bandwidth requested by the client device.

6. A sending method according to claim 1, 2, 3, or 4, wherein said item of information on a visual quality of the multimedia data stream is represented by a metric comparing the original data represented by said multimedia data stream and the result of decoding of said multimedia stream and said metric is a signal to noise ratio.

7. A sending method according to claim 1, 2, 3, or 4, further comprising the following steps:
    sending a multimedia data stream with a current visual quality;
    obtaining at least one item of information comprising an item of information on a visual quality higher than the current visual quality;
    obtaining at least one item of information comprising an item of information on a visual quality lower than the current visual quality; and
    sending said obtained items of information over the network to a client device.

8. A sending method according to claim 1, 2, 3, or 4, wherein the at least one item of information relative to the at least one of the multimedia data streams further comprises a compression rate.

9. A sending method according to claim 1, 2, 3, or 4, wherein the at least one item of information relative to the at least one of the multimedia data streams further comprises a compression technique.

10. A sending method according to claim 1, 2, 3, or 4, further comprising a step of storing the at least one item of information relative to the at least one of the multimedia data streams in an information table.

11. A sending method according to claim 1, 2, 3, or 4, wherein said at least one obtained item of information is sent by means of control packets of the RTP protocol.

12. A sending method according to claim 1, 2, 3, or 4, wherein said at least one obtained item of information is inserted in at least one field of a coding format of the at least one of the multimedia data streams prior to the sending of said at least one item of information.

13. A method according to claim 1, wherein said at least one item of information relative to the at least one of the multimedia data streams is obtained and sent periodically to the client device.

14. A method of receiving items of information relative to a plurality of multimedia data streams coming from a plurality of server devices of a communication network, comprising the following steps carried out on a client device capable of simultaneously receiving a plurality of multimedia data streams from the network:
    receiving, from at least one of the server devices at least one item of information relative to the multimedia data stream capable of being sent by said at least one server device, said at least one item of information comprising an item of information on a visual quality of the multimedia data stream, and an item of information making it possible to obtain the bandwidth necessary for sending the stream with that visual quality;
    sending a request to said at least one of the server devices specifying a visual quality called priority visual quality and/or bandwidth for one of the multimedia data streams to be sent therefrom based on the management, by the client device, of the video quality and/or bandwidth of the multimedia video streams simultaneously sent from the plurality of server devices to the client device; and
    sharing the bandwidth available on the network between the multimedia data streams capable of being simultaneously received by the client device on the basis of said at least one item of information received,
wherein the priority visual quality is of a higher visual quality than the quality of the other multimedia video streams, and
the visual qualities of the plurality of multimedia video streams received by the client device are represented by a metric based on the priority visual quality, the average value of the visual qualities of the other multimedia video streams simultaneously transmitted and the variances of the visual qualities of the other multimedia video streams.

15. A receiving method according to claim 14, wherein the sharing step is carried out on the basis of a predetermined criterion.

16. A receiving method according to claim 15, wherein the predetermined criterion depends on the selection of a main multimedia data stream.

17. A receiving method according to claim 14, 15, or 16, further comprising the following steps:
wherein the management, by the client device, of the video quality and/or bandwidth of the multimedia video streams simultaneously sent from the plurality of server devices to the client device comprises, on the basis of items of information on different possible qualities of the same multimedia data stream, selecting an item of information on a given visual quality;
wherein said sending step comprises sending at least one item of data to the corresponding server device enabling a determination to be made of the item of information relative to the data stream selected from said at least one received item of information relative to the data stream; and
receiving, the multimedia data stream on the basis of said received item of information.

18. A receiving method according to claim 17, wherein said at least one item of data is at least one item of information relative to the data stream.

19. A receiving method according to claim 14, 15, or 16, wherein said sending step comprises a step of sending at least one item of data, said at least one item of data making it possible to determine a visual quality of the multimedia data stream and the bandwidth necessary for sending the stream with that visual quality.

20. A receiving method according to claim 14, 15, or 16, wherein the item of information relative to the data stream further comprises the compression rate.

21. A receiving method according to claim 14, 15, or 16, wherein the item of information relative to the data stream further comprises a compression technique.

22. A receiving method according to claim 14, 15, or 16, wherein said at least one obtained item of information is received by means of control packets of the RTP protocol.

23. A receiving method according to claim 14, 15, or 16, wherein said at least one obtained item of information is inserted into at least one field of the coding format of the received data stream.

24. A device for sending at least one item of information relative to a multimedia data stream in a communication network from a server device to a client device that receives a plurality of multimedia data streams from different server devices, and being implemented on one of the server devices capable of sending at least one of the multimedia data streams over the network, said device comprising:
a processor configured to obtain at least one item of information relative to the at least one of the multimedia data streams, said at least one item of information relative to the at least one of the multimedia data streams comprising an item of information on a visual quality of the multimedia data stream, and an item of information making it possible to obtain the bandwidth necessary for sending the stream with that visual quality; and
a communication interface configured to send said at least one obtained item of information over the communication network to a client device and to receive from the client device a request specifying a visual quality called priority visual quality and/or bandwidth for the multimedia data stream to be sent to the client device based on the management of the video quality and/or bandwidth of the multimedia video streams from the different servers transmitting their multimedia video stream simultaneously to the client device,
wherein the priority visual quality is of a higher visual quality than the quality of the other multimedia video streams, and
the visual qualities of the plurality of multimedia video streams received by the client device are represented by a metric based on the priority visual quality, the average value of the visual qualities of the other multimedia video streams simultaneously transmitted and the variances of the visual qualities of the other multimedia video streams.

25. A sending device according to claim 24, said communication interface comprising a receiving communication interface configured to receive the request, the request comprising at least one item of data, said at least one item of data making it possible to determine an item of information relative to the data stream selected by the client device from said at least one sent item of information relative to the data stream, said device further comprising a multimedia-data-stream-sending communication interface configured to send the multimedia data stream on the basis of said selected item of information.

26. A sending device according to claim 24, said communication interface comprising a receiving communication interface configured to receive the request, the request comprising at least one item of data, said at least one item of data making it possible to determine a visual quality of the multimedia data stream and the bandwidth necessary for sending the stream with that visual quality, said device further comprising:
a visual-quality-and-bandwidth-determining processor configured to determine on the basis of said item of data, said visual quality and the bandwidth necessary for sending the stream with that visual quality; and
a multimedia-data-stream-sending communication interface configured to send the multimedia data stream on the basis of the determined visual quality and bandwidth.

27. A sending device according to claim 26, wherein the multimedia-data-stream-sending communication interface configured to send the multimedia data stream is also configured to carry out the sending operation on the basis of the item of information on the bandwidth selected by the client device.

28. A sending device according to claim 24, 25, or 26, further comprising:
a current-visual-quality, multimedia-data-stream-sending communication interface configured to send the at least one of the multimedia data streams with a current visual quality;
a higher-than-current-visual-quality-information-item processor configured to obtain at least one item of information comprising an item of information on a visual quality higher than the current visual quality;

a lower-than-current-visual-quality-information-item processor configured to obtain at least one item of information comprising an item of information on a visual quality lower than the current visual quality; and
an obtained-items-sending communication interface configured to send said obtained items of information over the network to a client device.

29. A sending device according to claim 24, 25, or 26, further comprising a memory configured to store the items of information relative to the data stream in an information table.

30. A sending device according to claim 24, 25, or 26, further comprising a control-packet-sending communication interface configured to send control packets of the RTP protocol comprising said at least one obtained item of information.

31. A sending device according to claim 24, 25, or 26, further comprising an inserting device configured to insert said at least one obtained item of information in at least one field of the coding format of the data stream prior to the sending of said at least one item of information.

32. A device for receiving items of information relative to a plurality of multimedia data streams coming from a plurality of server devices of a communication network, implemented on a client device capable of simultaneously receiving a plurality of multimedia data streams from the network, said device comprising:
a communication interface configured to receive, from at least one of the server devices at least one item of information relative to the multimedia data stream capable of being sent by said at least one of the server devices, said at least one item of information comprising an item of information on a visual quality of the multimedia data stream, and an item of information making it possible to obtain the bandwidth necessary for sending the stream with that visual quality, and configured to send a request to said at least one of the server devices specifying a visual quality called priority visual quality and/or bandwidth for one of the multimedia data streams to be sent therefrom based on the management, by the client device, of the video quality and/or bandwidth of the multimedia video streams simultaneously sent from the plurality of server devices to the client device; and
a processor configured to share the bandwidth available on the network between the multimedia data streams capable of being simultaneously received by the client device on the basis of said at least one item of information received,
wherein the priority visual quality is of a higher visual quality than the quality of the other multimedia video streams, and
the visual qualities of the plurality of multimedia video streams received by the client device are represented by a metric based on the priority visual quality, the average value of the visual qualities of the other multimedia video streams simultaneously transmitted and the variances of the visual qualities of the other multimedia video streams.

33. A receiving device according to claim 32, further comprising:
a selecting device configured to select an item of information on a given visual quality on the basis of items of information on different possible qualities of the same multimedia data stream;
a sending communication interface configured to send the request, the request comprising at least one item of data to the corresponding server device enabling a determination to be made of the item of information relative to the data stream selected from said at least one received item of information relative to the data stream, and
a multimedia-data-stream-receiving communication interface configured to receive the multimedia data stream on the basis of said received item of information.

34. A receiving device according to claim 32, further comprising a sending communication interface configured to send the request, the request comprising at least one item of data, said at least one item of data making it possible to determine a visual quality of the multimedia data stream and the bandwidth necessary for sending the stream with that visual quality.

35. A receiving device according to claim 32, further comprising a control-packet-receiving communication interface configured to receive control packets of the RTP protocol comprising said at least one item of information.

36. A receiving device according to claim 32, wherein said at least one obtained item of information is included in at least one field of the coding format of the received data stream.

37. A telecommunications system comprising a plurality of terminal devices connected via a telecommunications network, comprising at least one terminal device equipped with a device for sending at least one item of information relative to a multimedia data stream in a communication network according to claim 24, 25, or 26 and at least one terminal device equipped with a device for receiving items of information relative to a plurality of multimedia data streams according to claim 32.

38. A computer program stored on a non-transitory computer-readable medium that can be loaded into a computer system, said program containing instructions enabling the implementation of the method of sending at least one item of information relative to a multimedia data stream in a communication network according to claim 1, 2, 3, or 4, when that program is loaded and executed by a computer system.

39. A computer program stored on a non-transitory computer-readable medium that can be loaded into a computer system, said program containing instructions enabling the implementation of the method of receiving items of information relative to a plurality of multimedia data streams coming from at least one server device of a communication network according to claim 14, 15, or 16, when that program is loaded and executed by a computer system.

* * * * *